US008832812B1

(12) United States Patent
Morneau et al.

(10) Patent No.: US 8,832,812 B1
(45) Date of Patent: Sep. 9, 2014

(54) METHODS AND APPARATUS FOR AUTHENTICATING A USER MULTIPLE TIMES DURING A SESSION

(75) Inventors: Todd Morneau, Sudbury, MA (US); William Duane, Westford, MA (US)

(73) Assignee: EMC Corporation, Hopkinton, MA (US)

( * ) Notice: Subject to any disclaimer, the term of this patent is extended or adjusted under 35 U.S.C. 154(b) by 265 days.

(21) Appl. No.: 13/076,869

(22) Filed: Mar. 31, 2011

(51) Int. Cl.
*G06F 7/04* (2006.01)
*G06F 15/16* (2006.01)
*G06F 17/30* (2006.01)
*H04L 29/06* (2006.01)

(52) U.S. Cl.
USPC ............................................................ 726/7

(58) Field of Classification Search
USPC ............................................................ 726/7
See application file for complete search history.

(56) References Cited

U.S. PATENT DOCUMENTS

| 5,442,342 | A   | * | 8/1995  | Kung ............................ 340/5.27 |
| 6,317,838 | B1  | * | 11/2001 | Baize ............................... 726/11 |
| 6,934,848 | B1  | * | 8/2005  | King et al. ...................... 713/182 |
| 7,562,221 | B2  |   | 7/2009  | Nystrom et al. |
| 7,606,771 | B2  | * | 10/2009 | Keresman et al. .............. 705/67 |
| 7,644,434 | B2  | * | 1/2010  | Pollutro et al. ................... 726/7 |
| 8,086,853 | B2  | * | 12/2011 | Warwick ........................ 713/168 |
| 2008/0072295 | A1 | * | 3/2008 | Borenstein et al. ............... 726/4 |

* cited by examiner

*Primary Examiner* — Dant Shaifer Harriman
(74) *Attorney, Agent, or Firm* — Ryan, Mason & Lewis, LLP

(57) ABSTRACT

Access of a user to a protected resource during a session is controlled by issuing an authentication information request and receiving authentication information from the user responsive to the authentication information request. The user is authenticated based upon verification of the received authentication information. One or more of the issuing, receiving and authenticating steps are repeated during the session to re-authenticate the user. At least a portion of the authentication information that is used during the re-authentication is different from a corresponding portion of the authentication information that was used during the initial authentication. A secure channel is optionally established between the user and the protected resource responsive to the initial verification. The secure channel can optionally be re-established with the re-authentication using the different portion of the authentication information.

28 Claims, 4 Drawing Sheets

METHODS AND APPARATUS FOR AUTHENTICATING A USER MULTIPLE TIMES DURING A SESSION

FIELD OF THE INVENTION

The present invention relates generally to security techniques for authenticating users over a network or in other types of communication systems.

BACKGROUND OF THE INVENTION

In order to gain access to applications or other resources via a computer or other user device, users are often required to authenticate themselves by entering authentication information. Such authentication information may comprise, for example, passwords that are generated by a security token carried by a user. These passwords may be one-time passwords that are generated using a time-synchronous or event-based algorithm. One particular example of a well-known type of security token is the RSA SecurID® user authentication token commercially available from RSA Security Inc. of Bedford, Mass., U.S.A.

Generally, such security token-based authentication techniques provide one-time authentication at the beginning of a session to verify a user (often referred to as single sign-on authentication techniques). U.S. Pat. No. 7,562,221 to Nyström et al., assigned to the assignee of the present invention and incorporated by reference herein, also discloses single sign-on authentication techniques that allow multiple accesses by a user to one or more applications or other resources.

With the increasing prevalence of malicious software (malware) and hackers, however, one-time authentication at the beginning of a session may not provide sufficient security. Malware includes computer viruses, Trojan horses, worms and other malicious and unwanted software programs. Trojan horses, for example, can install themselves on user machines without being perceived by the user. Trojan horses may then enable a controller to record keyboard entries from an infected machine (e.g., Key Loggers), listen in on conversations (e.g., Man in The Middle or MiTM), or even hijack an HTTP session from within a browser (e.g., Man in The Browser or MiTB). In this manner, Trojan horses can secretly obtain user names and passwords, or alter transactions as they occur. Thus, the user may think he or she is performing a legitimate transaction (e.g., paying a bill) but in reality the user is sending money to another account. Trojan horses also allow session hijacking, whereby a remote fraudster performs transactions via the user's infected machine.

Thus, improved security techniques are needed to reduce the susceptibility of a user to such malware and hacking. In addition, improved security techniques are needed that authenticate a user multiple times over the course of a session.

SUMMARY OF THE INVENTION

The present invention in the illustrative embodiments described herein provides methods and apparatus for authenticating a user multiple times during a session. In accordance with an aspect of the invention, access of a user to a protected resource during a session is controlled by issuing an authentication information request and receiving authentication information from the user responsive to the authentication information request. The user is authenticated based upon verification of the received authentication information. One or more of the issuing, receiving and authenticating steps are repeated during the session to re-authenticate the user. At least a portion of the authentication information that is used during the re-authentication is different from a corresponding portion of the authentication information that was used during the initial authentication. For example, the different portion of the authentication information can be a variable tokencode (or a variation thereof) obtained from a security token.

According to another aspect of the invention, a secure channel is established between the user and the protected resource responsive to the initial verification. The secure channel can be based on at least a portion of the initial authentication information. The secure channel can be re-established with the re-authentication using the different portion of the authentication information.

The authentication techniques of the illustrative embodiments overcome one or more of the problems associated with the conventional techniques described previously and provide improved security by requiring users to authenticate themselves multiple times over the course of a session. Moreover, no modification of the applications or communication protocols is required. These and other features and advantages of the present invention will become more readily apparent from the accompanying drawings and the following detailed description.

DETAILED DESCRIPTION

The present invention provides improved security techniques to reduce the susceptibility of a user to malware and hacking. According to one aspect of the invention, a user is authenticated multiple times over the course of a session using variable authentication information. Thus, an initial conventional authentication of a user generally comprises issuing a request for authentication information, receiving the requested authentication information from the user and authenticating the user based upon verification of the received authentication information. An authentication process in accordance with the present invention repeats the authentication during the same session to re-authenticate the user by varying at least a portion of the authentication information used during the first authentication.

The present invention will be described herein with reference to an exemplary communication system in which a user device, referred to herein as a client-side computing device, communicates with an authentication authority and one or more additional entities, such as a protected resource. It is to be appreciated, however, that the invention is not restricted to use in this or any other particular system configuration.

Figure 1:
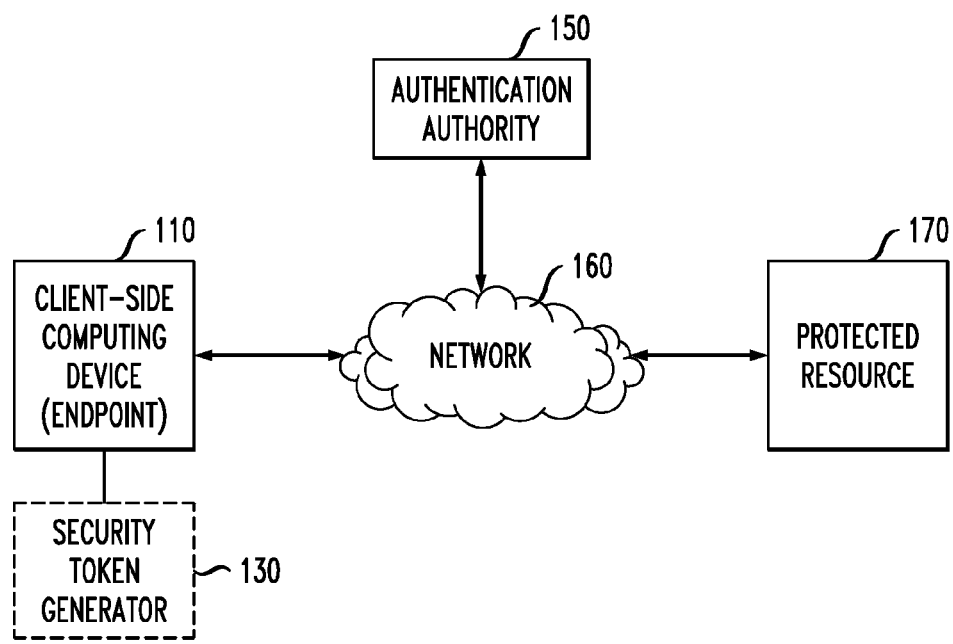
FIG. 1 illustrates an exemplary network environment in which the present invention can operate.

FIG. 1 illustrates an exemplary client-side computing device (CSCD) 110 communicating with a protected resource 170 over a network 160. In an exemplary implementation, the user must authenticate with an authentication authority 150 using a token generated by a security token generator 130 (hereinafter, referred to as security token 130) before obtaining access to the protected resource 170. The network 160, may comprise, for example, a global computer network such as the Internet, a wide area network (WAN), a local area network (LAN), a satellite network, a telephone or cable network, or various portions or combinations of these and other types of networks.

According to one aspect of the invention, the user of the CSCD 110 is authenticated multiple times over the course of a session with the protected resource 170 using a variable key. The exemplary communications among the system elements 110, 130, 150, 170 of FIG. 1 to achieve multiple authentication over the course of a user session with the protected resource 170 is discussed further below in conjunction with FIGS. 4 and 5.

It is to be appreciated that a given embodiment of the disclosed system may include multiple instances of CSCD 110, security token 130, authentication authority 150 and protected resource 170, and possibly other system components, although only single instances of such components are shown in the simplified system diagram of FIG. 1 for clarity of illustration.

As used herein, the term "session" with a protected resource 170 shall mean an interactive information interchange between a CSCD 110 and the protected resource 170.

The security token 130 is shown in FIG. 1 as being separate from and electrically connected to the CSCD 110. The security token 130 may be implemented, for example, using the RSA SecurID® user authentication token commercially available from RSA Security Inc. of Bedford, Mass., U.S.A. The security token 130 may be a server or other type of module that is accessible over the network 160, or it may be a software component resident on the CSCD 110. As another alternative, token 130 may be distributed over multiple devices, one of which may be the CSCD 110. Thus, while the present invention is illustrated herein using a security token 130 electrically connected to the CSCD 110, such that the CSCD 110 can read a given token code (or another authentication value) directly from the token 130, other implementations are within the scope of the present invention, as would be apparent to a person of ordinary skill in the art. For example, for other security tokens 130 that are not connectable to a computer or other user device in this manner, the user may manually enter a password or another value displayed by the token 130 at the time of the attempted access. In addition, for a detailed discussion of a modular and/or component implementation of a token-based authentication technique, see, for example, U.S. Pat. No. 7,562,221 to Nyström et al., assigned to the assignee of the present invention and incorporated by reference herein.

The CSCD 110 may represent a portable device, such as a mobile telephone, personal digital assistant (PDA), wireless email device, game console, etc. The CSCD 110 may alternatively represent a desktop or laptop personal computer (PC), a microcomputer, a workstation, a mainframe computer, a wired telephone, a television set top box, or any other information processing device which can benefit from the use of authentication techniques in accordance with the invention.

The CSCD 110 may also be referred to herein as simply a "user." The term "user" should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device. Similarly, a password or other authentication information described as being associated with a user may, for example, be associated with a CSCD device 110, a person utilizing or otherwise associated with the device, or a combination of both the person and the device.

The authentication authority 150 is typically a third party entity that processes authentication requests on behalf of web servers and other resources, and verifies the authentication information that is presented by a CSCD 110.

The protected resource 170 may be, for example, an access-controlled application, web site or hardware device. In other words, a protected resource 170 is a resource that grants user access responsive to an authentication process, as will be described in greater detail below. The protected resource 170 may be, for example, a remote application server such as a web site or other software program or hardware device that is accessed by the CSCD 110 over a network 160.

Figure 2:
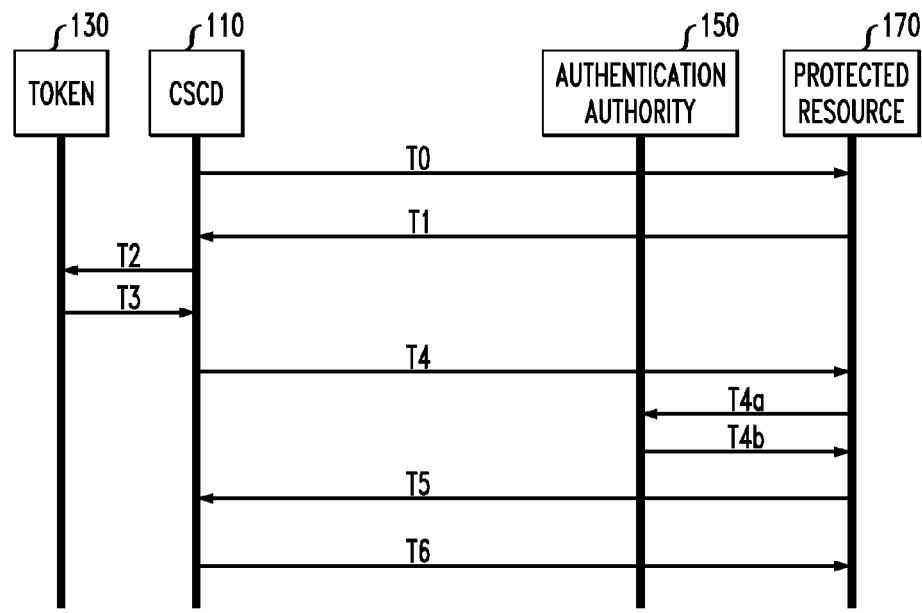
FIGS. 2 and 3 illustrate exemplary conventional single-sign on authentication processes.

FIG. 2 illustrates communications among various system elements 110, 130, 150, 170 of FIG. 1 at particular points in time, denoted T0 through T6, for an exemplary conventional single-sign on authentication process. For a more detailed discussion of suitable single-sign on authentication techniques, see, for example, U.S. Pat. No. 7,562,221 to Nyström et al., assigned to the assignee of the present invention and incorporated by reference herein.

As shown in FIG. 2, at time T0, the CSCD 110 requests access to a protected resource 170. At time T1, the protected resource 170 requests authentication information (e.g., a passcode comprised of the tokencode and password) from the CSCD 110. At times T2 and T3, the CSCD 110 obtains a portion of the authentication information from the exemplary token 130 (e.g., the tokencode) and combines it with authentication information of the user (e.g., a password).

At time T4, the CSCD 110 sends the authentication information (e.g., a passcode comprised of the tokencode and password) to the protected resource 170. At times T4a and T4b, the protected resource 170 contacts the authentication authority 150 to verify the authentication information received from the CSCD 110. In one variation, where the protected resource 170 delegates the authentication process to the authentication authority 150, upon requesting access to the protected resource 170 at time T0, the CSCD 110 can be redirected by the protected resource 170 to the authentication authority 150 until the authentication information is verified.

At time T5, upon verification of the authentication information by the authentication authority 150, the protected resource 170 grants the user of the CSCD 110 permission to gain access to the protected resource 170. At time T6, access to the protected resource 170 is provided.

Figure 3:
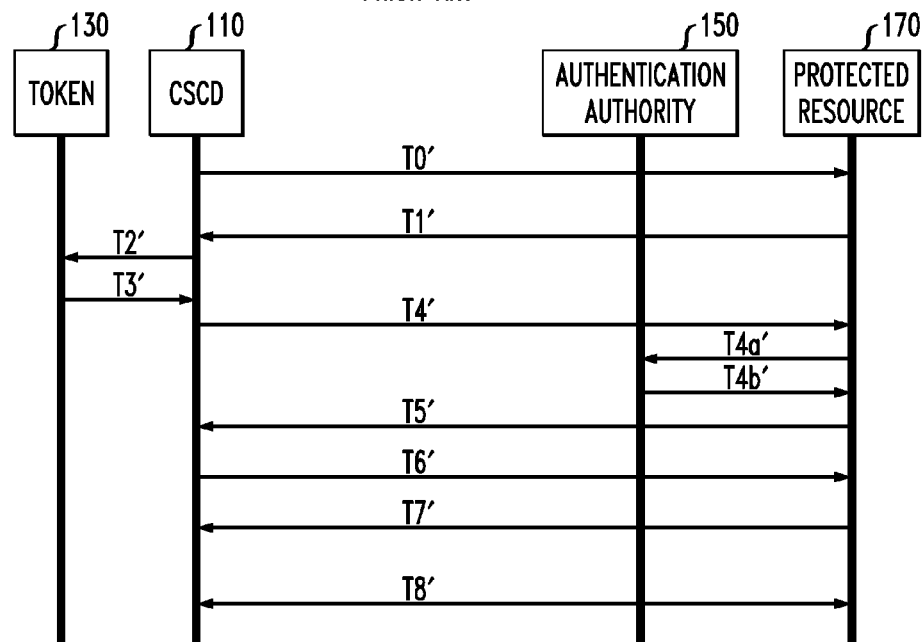

FIG. 3 illustrates communications among the various system elements 110, 130, 150, 170 of FIG. 1 at particular points in time, denoted T0' through T8', for an exemplary conventional single-sign on authentication process that provides a secure communication channel. Times T0' through T5' of FIG. 3 proceed generally in the same manner as corresponding times T0 through T5 of FIG. 2.

At time T6', the CSCD 110 sends information (e.g., a proposed encryption protocol and shared key) to the protected resource 170. The transmitted information is used to create a secure channel between the CSCD 110 and the protected resource 170, in a known manner. At time T7', the protected resource 170 sends a response (e.g., an acknowledgement) to the secure channel request. The communications of times T6' and T7' can be repeated, for example, if the protected resource 170 does not support the encryption protocol proposed by the CSCD 110, or the protected resource 170 otherwise requests an alternate encryption protocol.

At time T8', the secure channel is established using the agreed-upon authentication information and the shared keys exchanged at times T6' and T7'.

Figure 4:
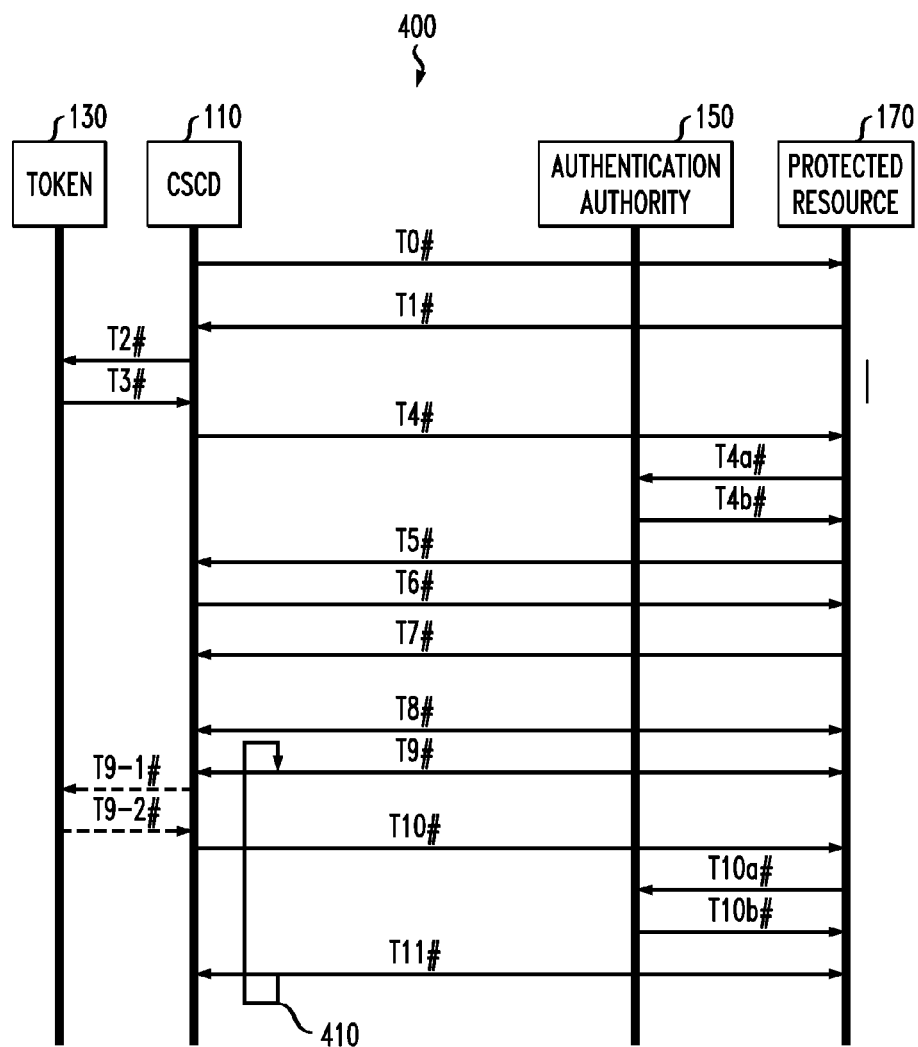
FIGS. 4 and 5 illustrate exemplary authentication processes incorporating features of the present invention.

FIG. 4 illustrates communications among the various system elements 110, 130, 150, 170 of FIG. 1 at particular points in time, denoted T0# through T11#, for an exemplary authentication process 400 incorporating features of the present invention. The disclosed authentication process 400 authenticates a user multiple times over the course of a session in accordance with the present invention and optionally provides a secure communication channel using variable keys that vary based on time and/or an event. Generally, multiple authentications performed by the process 400 can be triggered, for example, based on time and/or events.

Times T0# through T5# of FIG. 4 proceed generally in the same manner as corresponding times T0 through T5 of FIG. 2.

Generally, relative to the authentication process of FIG. 3, the disclosed authentication process 400 replaces the static shared key that is employed at times T6' and T7' of FIG. 3 to establish a secure channel at times T6# and T7# of FIG. 4 with a variable key that is derived from knowledge known only to the CSCD 110 and authentication authority 150.

At time T6#, the CSCD 110 sends information to the protected resource 170 which can be used to create a secure channel between the CSCD 110 and the protected resource 170. For example, the secure channel can be obtained using the portion of the credential obtained from the token 130 (e.g., a tokencode) at times T2# and T3#. In this manner, the security of the secure channel is enhanced as it is based on a credential that is valid only for a short duration. The CSCD 110 and the protected resource 170 must employ a matching encryption protocol to ensure the generation of symmetric keys. The obtained tokencode can be hashed, for example, with a username applied to a round of Advanced Encryption Standard (AES) encryption with a preshared key, to obtain the desired secure channel encryption.

At time T7#, the protected resource 170 sends a response (e.g., an acknowledgement) to the secure channel request. At time T8#, the secure channel is established using the desired secure channel encryption of times T6# and T7#.

In accordance with the present invention, at time T9#, the protected resource 170 (or CSCD 110) can optionally request that the secure channel be re-established, using a variable key derived, for example, from the user's tokencode (a time or event based credential). For example, the secure channel can be re-established at time T9# based on the passage of a predefined amount of time, or based on the occurrence of a predefined event, such as detection of one or more behaviors that are classified as "suspicious behavior" suggesting the possible involvement of malware or a hacker (such as a slower-than-expected response time of the CSCD 110).

For example, the secure channel can be updated at time T9# using an updated portion of the credential obtained from the token 130 (e.g., a tokencode) obtained at times T9-1# and T9-2#. The updated tokencode can be sent by the CSCD 110 to the protected resource 170 at time T10#. In this manner, the secure channel can be maintained using variable keys that change over time.

In addition, as shown in FIG. 4, at times T10a# and T10b#, the authentication authority 150 receives the information sent to re-authenticate the secure channel and verifies that it is correct, in a similar manner to the analysis performed at time T4#. For example, the authentication authority 150 may verify the accuracy of the updated tokencode.

At time T11#, upon verification of the updated tokencode, the secure channel is re-established using keys derived from the time or event based credential (e.g., the updated tokencode).

It is noted that the steps performed at times T9# through T11# are optionally repeated (as indicated by arrow 410) based upon the further passage of a predefined amount of time, or based on the occurrence of a predefined event (including a randomly generated event).

Figure 5:
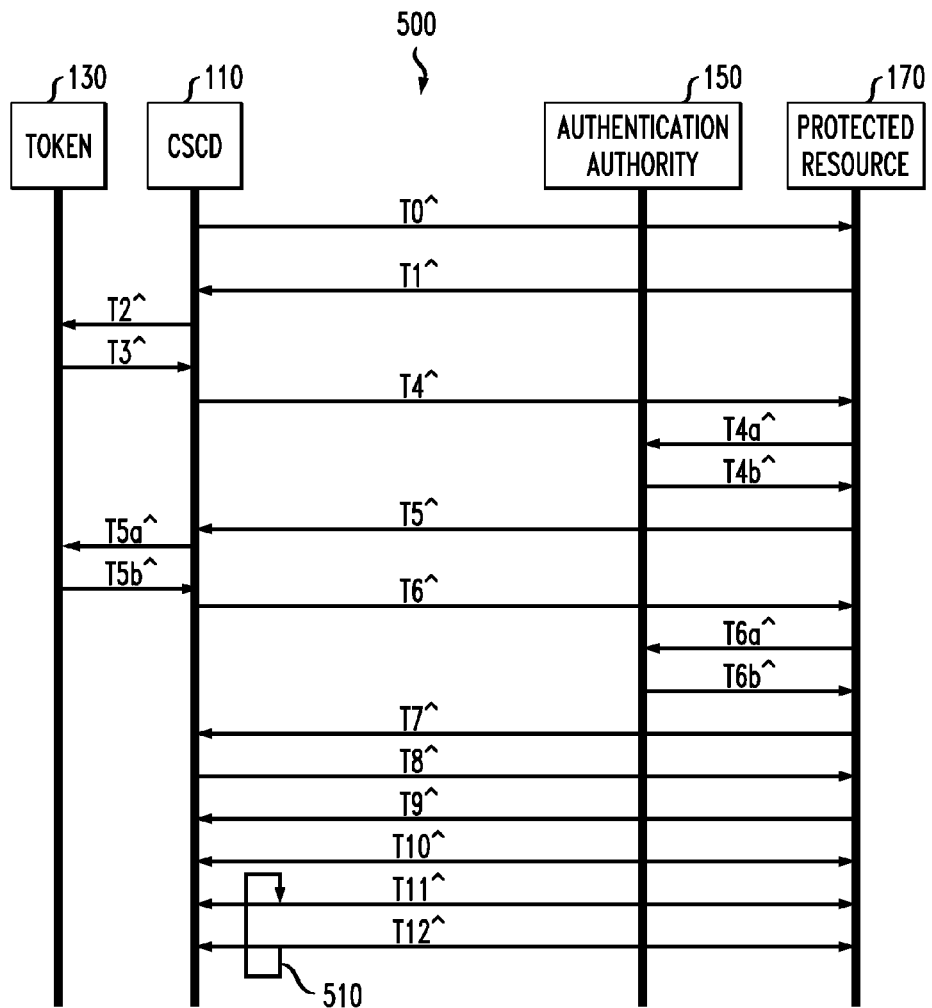

FIG. 5 illustrates communications among the various system elements 110, 130, 150, 170 of FIG. 1 at particular points in time, denoted T0^ through T12^, for an exemplary authentication process 500 incorporating features of the present invention. The disclosed authentication process 500 authenticates a user multiple times over the course of a session in accordance with the present invention and optionally provides a secure communication channel using variable keys based on a challenge/response.

Times T0^ through T4b^ of FIG. 5 proceed generally in the same manner as corresponding times T0 through T4b of FIG. 2, as modified to exchange public keys between the CSCD 110 and protected resource 170.

Thus, as shown in FIG. 5, at time T0^, the CSCD 110 requests access to the protected resource 170. At time T1^, the protected resource 170 requests authentication information (e.g., a passcode comprised of a tokencode and password) from the CSCD 110, and the protected resource 170 sends its public key to the CSCD 110. At times T2^ and T3^, the CSCD 110 obtains a portion of the authentication information from the exemplary token 130 (e.g., a tokencode) and combines it with authentication information of the user (e.g., a password).

At time T4^, the CSCD 110 sends the authentication information (e.g., a passcode comprised of the tokencode and password) to the protected resource 170, encrypted using the public key of the protected resource 170, together with the public key of the user of CSCD 110. At times T4a^ and T41b^, the protected resource 170 contacts the authentication authority 150 to verify the authentication information received from the CSCD 110. In one variation, where the protected resource 170 delegates the authentication process to the authentication authority 150, upon requesting access to the protected resource 170 at time T0^, the CSCD 110 can be redirected by the protected resource 170 to the authentication authority 150 until the authentication information is verified.

At time T5^, upon verification of the encrypted authentication information by the authentication authority 150, the protected resource 170 sends a challenge request to the CSCD 110 for the next tokencode, encrypted with the public key of the CSCD 110. The challenge request can be applied by the CSCD 110 to the security token 130 at time T5a^, and the challenge response generated by the security token 130 is returned to the CSCD 1110 at time T5b^.

At time T6^, the CSCD 110 sends the challenge response (based on the current tokencode) to the protected resource 170, encrypted with the public key of the CSCD 110. At times T6a^ and T6b^, the protected resource 170 contacts the authentication authority 150 to verify the authentication information received from the CSCD 110 during step T6^.

At time T7^, upon verification of the encrypted challenge response by the authentication authority 150, the protected resource 170 grants permission for the CSCD 110 to access the protected resource.

At time T8^, the CSCD 110 sends information to the protected resource 170 which can be used to create a secure channel between the CSCD 110 and the protected resource 170. For example, the secure channel can be obtained using the portion of the credential obtained from the token 130 (e.g., a tokencode) at times T5a^ and T5b^. The CSCD 110 and the protected resource 170 must employ a matching encryption protocol to ensure the generation of symmetric keys. The obtained tokencode can be hashed, for example, with a username applied to a round of Advanced Encryption Standard (AES) encryption with a preshared key, to obtain the desired secure channel encryption.

At time T9^, the protected resource 170 sends a response (e.g., an acknowledgement) to the secure channel request. At time T10^, the secure channel is established using the secure channel encryption of times T8^ and T9^.

At time T11^, the authentication agent 150 (or CSCD 110) requests the secure channel be re-established using the challenge response steps in T5^-T7^ above. Thus, the CSCD 110 obtains a new token code from the security token 130 after time T11^ (not shown in FIG. 5).

At time T12^, upon verification of the updated tokencode by the authentication authority 150, the secure channel is re-established using keys derived from the updated tokencode.

It is noted that the steps performed at times T11^ and T12^ are optionally repeated (as indicated by arrow 510) based upon a new request from the authentication agent 150 (or CSCD 110). In addition, a new request can be randomly generated.

Figure 6:
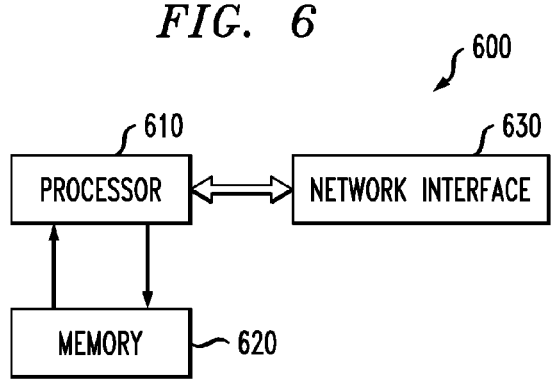
FIG. 6 illustrates one possible implementation of a given client-side computing device, authentication authority, protected resource or another processing device of the exemplary network environment of FIG. 1.

FIG. 6 shows one possible implementation of a given processing device 600 of the FIG. 1 system. The processing device 600 as shown may be viewed as representing, for example, CSCD 110, security token 130, authentication authority 150 and protected resource 170. The processing device 600 in this implementation includes a processor 610 coupled to a memory 620 and a network interface 630. These device elements may be implemented in whole or in part as a conventional microprocessor, digital signal processor, application-specific integrated circuit (ASIC) or other type of circuitry, as well as portions or combinations of such circuitry elements. As will be appreciated by those skilled in the art, portions of an authentication technique in accordance with an embodiment of the invention can be implemented at least in part in the form of one or more software programs that are stored in memory 620 and executed by the corresponding processor 610. The memory 620 is also used for storing information used to perform computations or other operations associated with the disclosed authentication on techniques.

As mentioned previously herein, the above-described embodiments of the invention are presented by way of illustrative example only. Numerous variations and other alternative embodiments may be used. For example, in the exemplary embodiment, the protected resource 170 directly requests authentication information from the CSCD 110. In further variations, the protected resource 170 can delegate the authentication process to the authentication authority 150. Thus, upon requesting access to the protected resource 170, the CSCD 110 is redirected to the authentication authority 150 until the authentication information is verified.

Additional details regarding certain conventional cryptographic techniques referred to herein may be found in, e.g., A. J. Menezes et al., Handbook of Applied Cryptography, CRC Press, 1997, which is incorporated by reference herein.

The term "authentication information" as used herein is intended to include passwords, passcodes, answers to life questions, or other authentication credentials, or values derived from such authentication credentials, or more generally any other information that a user may be required to submit in order to obtain access to an access-controlled application. Although the illustrative embodiments are described herein in the context of passwords, it is to be appreciated that the invention is more broadly applicable to any other type of authentication information.

The illustrative embodiments of the invention as described herein provide an improved authentication of users of password-based authentication systems. In particular, aspects of the present invention provide improved security by requiring users to authenticate themselves multiple times using different authentication information over the course of a session. Advantageously, the illustrative embodiments do not require changes to existing communication protocols. It is therefore transparent to both existing applications and communication protocols. The described techniques may be used with security tokens that generate one-time passwords or other types of authentication information, regardless of whether such tokens are connectable to the user device.

It should again be emphasized that the particular authentication techniques described above are provided by way of illustration, and should not be construed as limiting the present invention to any specific embodiment or group of embodiments. For example, as previously noted, the described embodiments may be adapted in a straightforward manner to operate with other types of time-varying credentials or authentication information, rather than just token codes, and other types of access-controlled resources. Also, the particular configuration of system elements shown in FIGS. 1 and 6, and their interactions as shown in FIGS. 4 and 5, may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method for controlling access of a user to a protected resource during a session, the method comprising the steps of:
   issuing an authentication information request responsive to an access request from the user to access the protected resource;
   receiving user-supplied authentication information from the user responsive to the authentication information request;
   authenticating the user based upon verification of the received authentication information; and
   repeating one or more of the issuing, receiving and authenticating steps during the session to re-authenticate the user using at least a portion of the user-supplied authentication information that is different from a corresponding portion of the user-supplied authentication information used during the first authenticating step, wherein said user-supplied authentication information received during an initial authentication and said user-supplied authentication information received during said re-authentication are based on a variable tokencode generated by a security token, wherein at least one of said issuing, receiving and authenticating steps is performed by at least one hardware device.

2. The method of claim 1, further comprising the step of establishing a secure channel between the user and the protected resource responsive to the verification.

3. The method of claim 2, further comprising the step of re-establishing the secure channel using the different portion of the authentication information.

4. The method of claim 2, wherein the secure channel is based on at least a portion of the authentication information.

5. The method of claim 1, wherein the step of repeating one or more of the issuing, receiving and authenticating steps is triggered based on a passage of time.

6. The method of claim 1, wherein the step of repeating one or more of the issuing, receiving and authenticating steps is triggered based on occurrence of a predefined event.

7. The method of claim 1, wherein the step of repeating one or more of the issuing, receiving and authenticating steps is triggered randomly.

8. The method of claim 1, wherein the step of repeating one or more of the issuing, receiving and authenticating steps further comprises the step of providing a response to a challenge.

9. The method of claim 1, wherein the step of repeating one or more of the issuing, receiving and authenticating steps is triggered by one or more of the user and the protected resource.

10. The method of claim 1, wherein the step of repeating one or more of the issuing, receiving and authenticating steps further comprises the step of obtaining the variable tokencode from the security token.

11. The method of claim 10, wherein the variable tokencode is derived from information contained within a challenge.

12. The method of claim 10, wherein the variable tokencode comprises a one-time password generated by a security token.

13. The method of claim 1, wherein the protected resource comprises one or more of an application, web site or hardware device.

14. The method of claim 1, wherein the authentication information request comprises a request for at least a portion of at least one password or other authentication credential associated with the user.

15. The method of claim 1, wherein the step of authenticating the user verifies the authentication information by checking that it is valid, has not been used before, and is within a designated lifetime of the session.

16. The method of claim 1, wherein said user-supplied authentication information received during said initial authentication and said user-supplied authentication information received during said re-authentication evolve over time.

17. The method of claim 1, wherein said user-supplied authentication information received during said initial authentication and said user-supplied authentication information received during said re-authentication are based on the variable tokencode generated by the same security token.

18. A non-transitory machine-readable recordable storage medium for storing one or more software programs for use in controlling user access to an access-controlled resource, wherein the one or more software programs when executed by one or more processing devices implement the steps of the method of claim 1.

19. An apparatus for controlling access of a user to a protected resource during a session, the apparatus comprising:
a memory; and
at least one processor, coupled to the memory, operative to implement the following steps:
issuing an authentication information request responsive to an access request from the user to access the protected resource;
receiving user-supplied authentication information from the user responsive to the authentication information request;
authenticating the user based upon verification of the received authentication information; and
repeating one or more of the issuing, receiving and authenticating steps during the session to re-authenticate the user using at least a portion of the user-supplied authentication information that is different from a corresponding portion of the user-supplied authentication information used during the first authenticating step, wherein said user-supplied authentication information received during an initial authentication and said user-supplied authentication information received during said re-authentication are based on a variable tokencode generated by a security token.

20. The apparatus of claim 19, wherein the processor is further configured to establish a secure channel between the user and the protected resource responsive to the verification.

21. The apparatus of claim 20, wherein the secure channel is re-established using the different portion of the authentication information.

22. The apparatus of claim 20, wherein the secure channel is based on at least a portion of the authentication information.

23. The apparatus of claim 19, wherein the re-authentication steps is triggered based on one or more of a passage of time, an occurrence of a predefined event and randomly.

24. The apparatus of claim 19, wherein the processor is further configured to provide a response to a challenge.

25. The apparatus of claim 19, wherein the processor is further configured to obtain the variable tokencode from the security token.

26. The apparatus of claim 19, wherein the protected resource comprises one or more of an application, web site or hardware device.

27. The apparatus of claim 19, wherein said user-supplied authentication information received during said initial authentication and said user-supplied authentication information received during said re-authentication evolve over time.

28. The apparatus of claim 19, wherein said user-supplied authentication information received during said initial authentication and said user-supplied authentication information received during said re-authentication are based on the variable tokencode generated by the same security token.

* * * * *